United States Patent
LaMarr, Jr. et al.

(10) Patent No.: US 10,408,182 B2
(45) Date of Patent: Sep. 10, 2019

(54) FUEL SHUT-OFF SOLENOID SYSTEM

(71) Applicant: WALBRO LLC, Tucson, AZ (US)

(72) Inventors: Gerald J. LaMarr, Jr., Bay City, MI (US); Robby L. Linton, Saginaw, MI (US)

(73) Assignee: Walbro LLC, Tucson, AZ (US)

( * ) Notice: Subject to any disclaimer, the term of this patent is extended or adjusted under 35 U.S.C. 154(b) by 244 days.

(21) Appl. No.: 15/468,248

(22) Filed: Mar. 24, 2017

(65) Prior Publication Data
US 2017/0198660 A1 Jul. 13, 2017

Related U.S. Application Data

(62) Division of application No. 14/331,310, filed on Jul. 15, 2014, now Pat. No. 9,638,135.

(60) Provisional application No. 61/860,301, filed on Jul. 31, 2013.

(51) Int. Cl.
*F02M 21/02* (2006.01)
*F02M 63/00* (2006.01)
*F16K 31/06* (2006.01)

(52) U.S. Cl.
CPC .... *F02M 63/0015* (2013.01); *F02M 21/0233* (2013.01); *F02M 21/0242* (2013.01); *F16K 31/06* (2013.01); *F02M 2700/4326* (2013.01); *Y02T 10/32* (2013.01)

(58) Field of Classification Search
CPC ........... F02M 21/0233; F02M 21/0242; F02M 63/0015; F02M 45/00; F16K 31/00
See application file for complete search history.

(56) References Cited

U.S. PATENT DOCUMENTS

| | | | |
|---|---|---|---|
| 4,111,010 A | 9/1978 | Minami | |
| 4,183,334 A | 1/1980 | Van Dine | |
| 4,244,334 A | 1/1981 | Maisch | |
| 4,290,107 A | 9/1981 | Suda | |
| 4,453,517 A | 6/1984 | Kasiewicz | |
| 4,662,333 A | 5/1987 | Martel | |
| 4,922,878 A * | 5/1990 | Shinogle | F02D 41/20 123/490 |
| 5,052,359 A | 10/1991 | Hardwick et al. | |
| 5,611,312 A | 3/1997 | Swanson | |
| 5,701,870 A * | 12/1997 | Gottshall | F02D 41/20 123/490 |
| 5,730,098 A | 3/1998 | Sasaki | |
| 6,401,685 B1 | 6/2002 | Warner | |

(Continued)

*Primary Examiner* — Grant Moubry
(74) *Attorney, Agent, or Firm* — Reising Ethington P.C.

(57) ABSTRACT

A fuel system that in at least some implementations includes a carburetor having a fluid passage, a solenoid, a valve, a driver circuit and a control circuit. The valve may be moved by the solenoid between an open position permitting fluid flow through the fluid passage and a closed position at least partially inhibiting fluid flow through the fluid passage. The driver circuit and control circuit are communicated with the solenoid to contribute to providing power to the solenoid and controlling actuation of the solenoid. The driver circuit and control circuit provide a first magnitude of power to the solenoid to initially change the solenoid from its closed position to its open position and a second magnitude of power to maintain the solenoid in its open position wherein the second magnitude of power is less than the first magnitude.

11 Claims, 3 Drawing Sheets

(56) References Cited

U.S. PATENT DOCUMENTS

| | | | |
|---|---|---|---|
| 6,615,792 B1 | 9/2003 | Grifka et al. | |
| 6,997,159 B2 * | 2/2006 | Stockner | F02M 51/061 |
| | | | 123/322 |
| 7,013,876 B1 * | 3/2006 | Puckett | F02D 41/20 |
| | | | 123/490 |
| 7,073,524 B2 * | 7/2006 | Chian | F16K 31/0675 |
| | | | 137/1 |
| 7,509,941 B2 | 3/2009 | Ottosson | |
| 7,882,822 B2 | 2/2011 | Cobb | |
| 8,132,561 B2 * | 3/2012 | Audisio | G05D 16/2093 |
| | | | 123/527 |
| 9,022,011 B2 | 5/2015 | Andersson | |
| 2010/0154750 A1 * | 6/2010 | Storch | F02D 41/20 |
| | | | 123/490 |
| 2012/0000445 A1 * | 1/2012 | Borg | F02D 41/3845 |
| | | | 123/497 |

\* cited by examiner

FUEL SHUT-OFF SOLENOID SYSTEM

REFERENCE TO CO-PENDING APPLICATIONS

This application is a division of copending application Ser. No. 14/331,310, filed Jul. 15, 2014, which claims the benefit of U.S. Provisional Application No. 61/860,301 filed Jul. 31, 2013, which is incorporated herein by reference in its entirety.

TECHNICAL FIELD

The present disclosure relates generally to a fuel shut-off solenoid.

BACKGROUND

Some fuel systems include solenoid valves to control fuel flow. The solenoids consume power and, when energized, generate heat and transmit heat to adjacent components. This is inefficient from a power standpoint and the heat can affect the operation or performance of the adjacent components, and/or fluids contained or flowing within the adjacent components.

SUMMARY

A fuel system that in at least some implementations includes a carburetor having a fluid passage, a solenoid, a valve, a driver circuit and a control circuit. The valve may be moved by the solenoid between an open position permitting fluid flow through the fluid passage and a closed position at least partially inhibiting fluid flow through the fluid passage. The driver circuit and control circuit are communicated with the solenoid to contribute to providing power to the solenoid and controlling actuation of the solenoid. The driver circuit and control circuit provide a first magnitude of power to the solenoid to initially change the solenoid from its closed position to its open position and a second magnitude of power to maintain the solenoid in its open position wherein the second magnitude of power is less than the first magnitude.

In at least some implementations, a method of operating a shut-off solenoid in a fuel system includes providing a first power to a solenoid valve at start-up to displace an armature of the solenoid from a first position to a second position, and providing a second power to the solenoid after a predetermined period following start-up, the second power being less than the first power and sufficient to maintain the solenoid in the second position. This reduces the power consumption of the solenoid and the heat generated by and transmitted from the solenoid.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
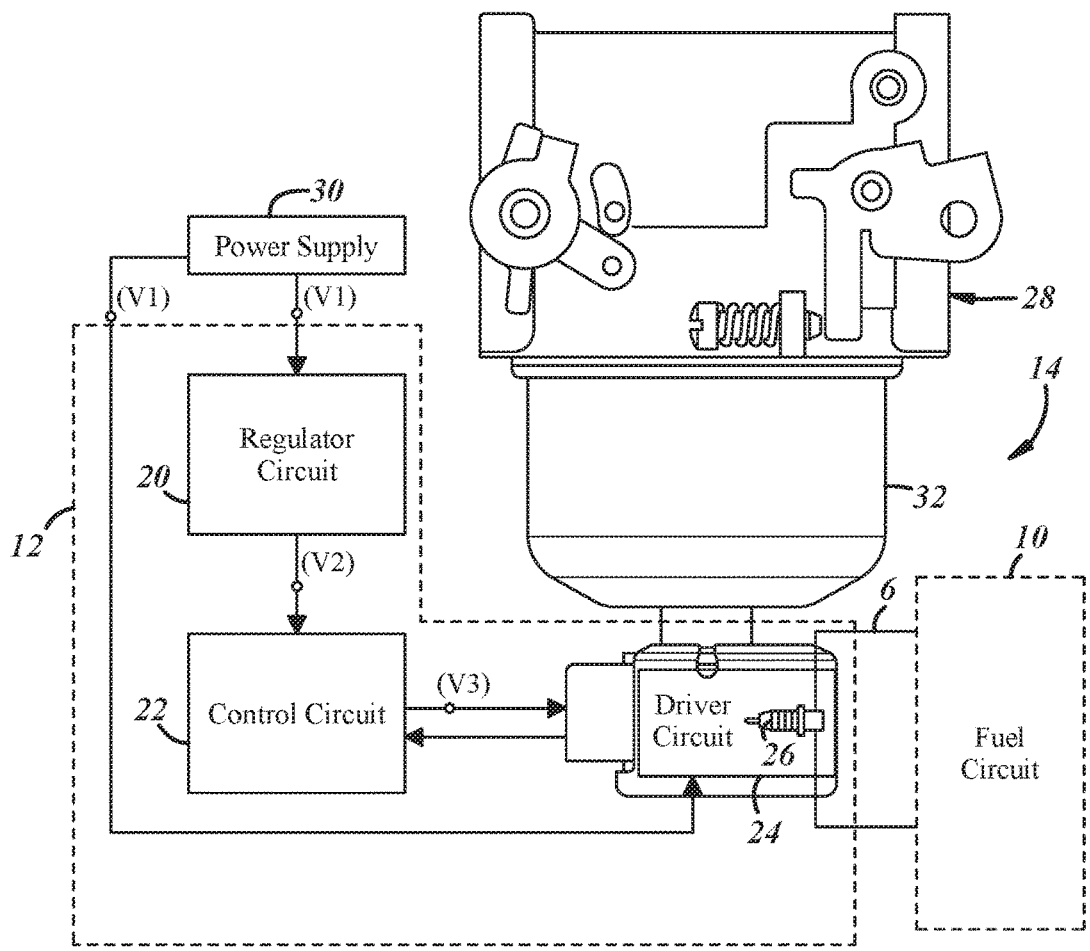
FIG. 1 is a flow control diagram of a fuel system according to one implementation.

Referring in more detail to the drawings, FIG. 1 is a flow control diagram illustrating a fuel circuit 10 and a solenoid power management (SPM) circuit 12 for a fuel system 14. The SPM circuit includes a regulator circuit 20, a control circuit 22, and a driver circuit 24 for a shut-off solenoid 26. The fuel system 14 further includes a carburetor 28 (e.g., having a float bowl 32) for providing a fuel/air mixture to an engine, and the shut-off solenoid 26 may be carried by, located proximate to or otherwise operably associated with the carburetor (e.g., on or near the float bowl). In at least some implementations, the solenoid 26 may be coupled to the fuel circuit 10 so that when the solenoid is energized or actuated by the SPM circuit, a passage in the fuel circuit is opened allowing the passage of fuel therethrough, e.g., from a fuel tank to an engine via the carburetor. Thus, the shut-off solenoid 26 remains energized during engine operation, in at least some implementations. While energized, solenoids typically generate heat. This heat is a form of unused energy and may have undesirable effects on the fuel system 14—e.g., it may heat the fuel carried by the carburetor 28. When the solenoid 26 is not energized, it acts as a valve to inhibit or prevent fuel flow through the passage; and in some instances, the de-energization of the solenoid 26 may prevent fuel delivery to the engine at shut-down thereby preventing an engine backfire. The SPM circuit 12 of the present disclosure reduces the overall power consumption of the shut-off solenoid 26 and minimizes the solenoid's dissipated heat.

Figure 2:
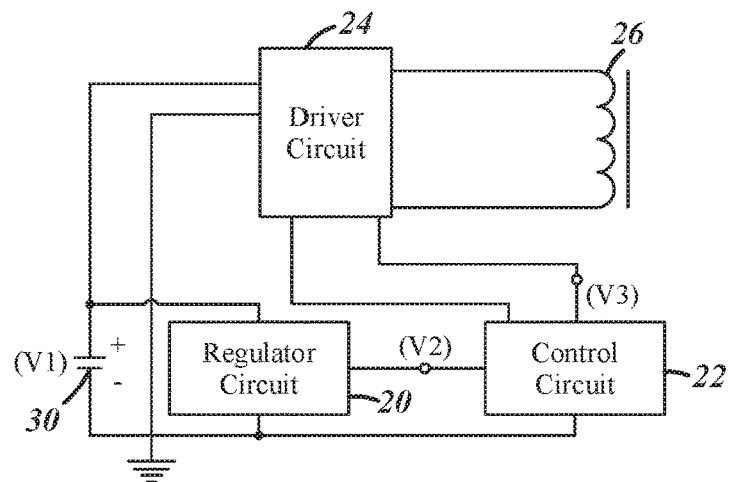
FIG. 2 is an electrical schematic diagram of the fuel system shown in FIG. 1.

FIGS. 1 and 2 further illustrate a power supply 30 for providing power to the SPM circuit 12. According to one implementation, after receiving power from the power supply 30, the regulator circuit 20 may pass regulated power to the control circuit 22. The control circuit communicates with the driver circuit 24; here, the communication is shown as two-way communication; however, it also may be one-way communication (e.g., from control circuit to driver circuit only). And as will be described in greater detail below, the driver circuit 24 may contribute to energizing the shut-off solenoid 26. In addition, the driver circuit is shown coupled to the power supply; thus, the driver circuit is directly coupled to the power supply and indirectly coupled thereto (i.e., via the regulator and control circuits).

The power supply 30 may be any suitable power source providing direct current (DC) or alternating current (AC). In the illustrated implementation, the power source is a battery providing DC current. The battery voltage may vary and be of any suitable magnitude. For example, in some implementations, the battery may provide between 10 and 16 Volts (V). Similarly, the battery may have a maximum allowable current draw; e.g., approximately 0.5 Amp (A). Other suitable characteristics of the exemplary battery will be apparent to skilled artisans. In the illustrated example (FIGS. 1-2), the power supply 30 provides a voltage (V1) to the fuel circuit 10, the regulator circuit 20, and the driver circuit 24.

Figure 3:
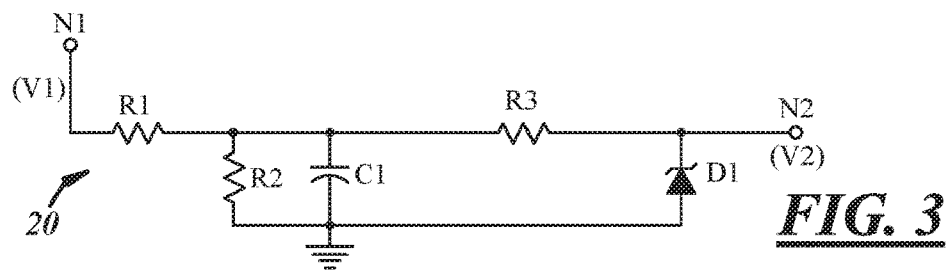
FIG. 3 is one implementation of a regulator circuit of the electrical schematic diagram of FIG. 2.

Upon receipt of the voltage (V1) at the regulator circuit 20, the regulator circuit may regulate and/or filter the power to remove voltage or current spikes or transient waveforms and other noise, ripples, etc. FIG. 3 illustrates one example of the regulator circuit 20; but it should be appreciated that other implementations are possible. Here, the regulator circuit 20 includes a node N1 for receiving an input voltage (V1) and a node N2 for providing an output voltage (V2) to the control circuit 22. Voltage (V1) is received through a voltage divider (R1, R2) to regulate the desired voltage level where R2 is tied to ground. A capacitor C1 may be placed in parallel with R2 and similarly tied to ground and may smooth any ripple or noise received at the node N1. The voltage may be further reduced via a resistor R3 before being provided to the output N2. Between R3 and N2, a zener diode D1 may be coupled and tied to ground and may serve as an overvoltage protector; e.g., the breakdown voltage of the diode (D1) may be less than or approximately equivalent to the voltage (V1) at N1. In addition, the values of R1 and R3 may be relatively small in relation to the value of R2. Thus, during normal operation, the majority of the current may pass from node N1 to node N2 via R1 and R3. In at least one implementation, the voltage (V2) may be approximately 5V.

Figure 4:
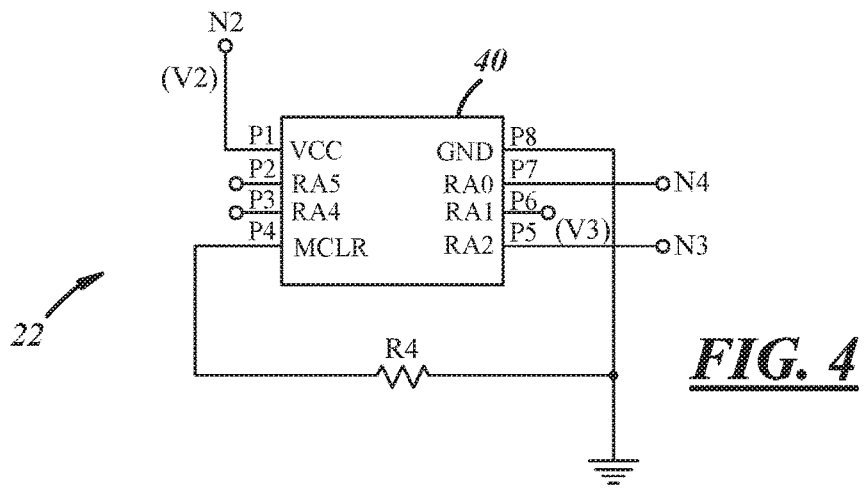
FIG. 4 is one implementation of a control circuit of the electrical schematic diagram of FIG. 2.

The output voltage (V2) of the regulator circuit 20 may be received by the control circuit 22 at node N2, as shown in FIG. 4. The control circuit may be any circuit designed to control the amplitude and/or frequency of the current and/or voltage provided to the solenoid 26 in the driver circuit 24. Thus, FIG. 4 illustrates one implementation of the control circuit 22 as including a microcontroller 40 having multiple connection pins (e.g., pin 1 or P1=input voltage; P2, P3, P5, P6, P7=input/output data; P4=reset or MCLR; and P8=ground). Microcontrollers may include or comprise a microprocessor and/or other control device and are known to skilled artisans and thus will not be fully described herein; furthermore, the illustrated microcontroller 40 is merely one example. In FIG. 4, the input voltage (V2) at node N2 is received at the pin P1, and pin P8 is tied to ground. Also, pin P4 (MCLR) is pulled to ground through a resistor R4. Pins P5 and P7 are shown coupled to N3 and N4, respectively, while the remaining pins are not connected. Pin P5 is configured to provide an output voltage (V3) from the microcontroller, and as will be explained below is received by the driver circuit 24. Pin P7 is configured as a current sense input from N4, which as will be described below, is a current received from the driver circuit. Thus, where pin P7 is used, the control circuit 22 has two-way communication with the driver circuit 24 (e.g., closed loop); where it is not used, communication is one-way only (or open loop).

The microcontroller 40 shown in FIG. 4 may be configured to provide different pulse width modulated (PWM) profiles via pin P5. These profiles may occur according to a predetermined sequence and/or timing (e.g., following receipt of an input voltage (V2) at pin P1) or the profiles may be responsive to and change according to the sensed current at pin P7. In at least one embodiment, each PWM profile may include a predetermined pattern of digital ones and zeros, according to conventional digital signaling processing (DSP) techniques. For example, a digital one or "1" is considered "ON" or high and is electronically represented as approximately 5V, and a digital zero or "0" is considered "OFF" or low and is electronically represented as approximately 0V. The PWM profiles may vary from one another by having different duty cycles and/or switching frequencies. As will be apparent to skilled artisans, the duty cycle may be a ratio of the amount of time that voltage (V3) is high ($t_1$) over the total amount of time ($t_{TOTAL}$); e.g., duty cycle=$t_1/t_{TOTAL}$. The microcontroller 40 shown in FIG. 4 may be configured to provide a duty cycle between 10% and 90%. In addition, the microcontroller may be configured to provide the 0V and 5V voltages according to a predetermined switching frequency between 10-30 kHz (kilohertz) (e.g., switching between high and low). Thus, in one PWM profile, the voltage may be a digital signal having a duty cycle between 50-100% (e.g., 80%) and a frequency of approximately 25 kHz. In another exemplary PWM profile, the voltage may be a digital signal having a duty cycle between 10-50% (e.g., 20%) and a frequency of approximately 25 kHz.

Figure 5:
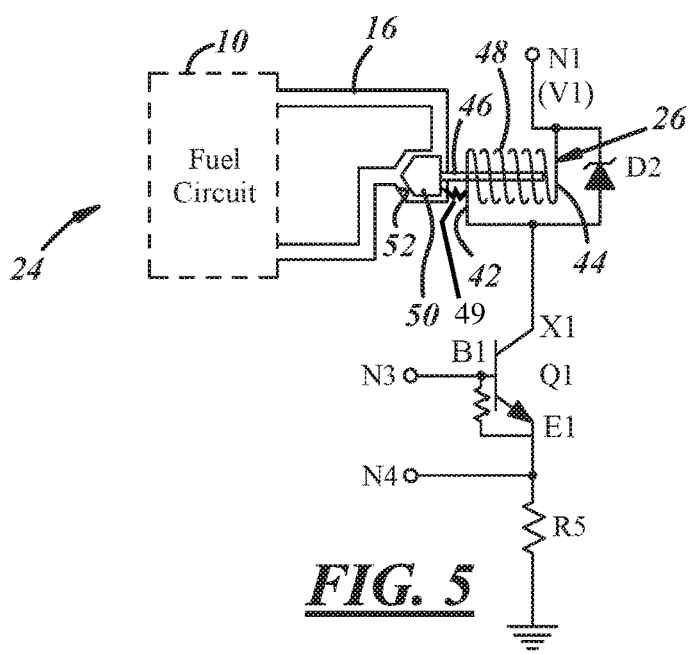
FIG. 5 is one implementation of a driver circuit of the electrical schematic diagram of FIG. 2.

As described above, two voltages are provided to the driver circuit 24: the voltage (V1) from the power supply 30 and the voltage (V3) from the microcontroller 40 (pin P5). FIG. 5 illustrates one embodiment of the driver circuit 24 and the fuel circuit 10. The voltage (V1) is received at node N1. The voltage (V1) is provided to the shut-off solenoid 26 and a zener diode D2 which are arranged in parallel. More specifically, the current at node N1 passes through the coil of the solenoid from a first end 42 to a second end 44 and then to a transistor (Q1). In addition, the zener diode D2 is oriented such that current is allowed to pass therethrough in its reverse direction if the voltage (V1) meets or exceeds its breakdown voltage (e.g., for providing overvoltage protection). The transistor Q1 (e.g., here illustrated as an NPN-type bipolar junction transistor) has a collector pin X1, a base pin B1, and an emitter pin E1. The collector pin X1 is coupled to the junction of the diode D2 and the second end 44 of the solenoid. The base pin B1 is coupled to node N3 (the output voltage (V3) of the microcontroller). And the emitter pin E1 is pulled to ground via a resistor R5 (e.g., a shunt resistor). In at least one embodiment (where a feedback signal is desired), node N4 may be coupled to the emitter pin E1 of the transistor Q1 between pin E1 and the resistor R5.

The fuel circuit 10 also is illustrated in FIG. 5. This fuel circuit may include any number of suitable passages (e.g. passage 16) for conveying fuel to various parts of the fuel system 14, e.g., the carburetor 28 and its float-bowl 32. The passage 16 of the fuel circuit 10 may have a port, opening or valve seat 52 that may be opened and closed thereby allowing the communication of fuel therethrough. As shown in FIG. 5, the valve is opened and closed according to the actuation or movement of an armature 46 of the shut-off solenoid 26.

The shut-off solenoid 26 may have the armature 46, one or more coils 48, one or more biasing springs (not shown) and may have at least one flow controller or valve head 50 coupled to the armature and engagable with the valve seat 52 in the passage 16. The solenoid 26 may be a push-type, pull-type, or both. In at least one implementation, the solenoid 26 is a pull-type having a single flow controller 50 that inhibits fuel flow when the solenoid is not powered under the force of a return spring 49 or other biasing member. Thus, the armature 46 and valve head 50 are biased in a first or closed position when the solenoid 26 is not energized, and the armature 46 is pulled into a second or open position when the solenoid is energized. The open position may include any position other than the closed position (e.g., fully open, partially open, etc.). In FIG. 5, the solenoid 26 is shown in an open position wherein the valve head 50 is spaced from and not engaged with the valve seat 52 so that fuel may flow through the valve seat 52. Skilled artisans will appreciate that actuation of the armature 46 and the flow inhibitor 50 requires a sufficient primary or in-rush current through the coil 48 to move the armature 46 form the closed position to an open position (displacing the armature due to a sufficient magnetic field). In addition, a sufficient secondary current must be maintained to retain the armature in the open position. The secondary current may be less than the primary current.

As previously discussed, the shut-off solenoid 26 may be mounted to or carried by the carburetor 28 shown in FIG. 1. Here, the carburetor 28 is shown as a float-bowl carburetor, but of course other types of carburetors, including but not limited to diaphragm carburetors, (and other mounting locations) are possible.

Thus, there has been described one implementation of the fuel system 14 having the regulator circuit 20, the control circuit 22, and the driver circuit 24 for operating the shut-off solenoid 26 which couples the driver circuit to the fuel circuit 10. When the power is provided to the regulator, control, and driver circuits, the shut-off solenoid 26 may be energized thereby displacing the armature 46 and valve head 50 and opening the fuel passage 16 in the fuel circuit 10 which may allow the communication of fuel to the carburetor 28, engine, etc. And when power is discontinued to the regulator, control, and driver circuits, the solenoid armature 46 may be displaced again according to the biasing spring 49 thereby closing the fuel passage 16 (by engagement of the valve head 50 with the valve seat 52).

In operation, the power consumed by the shut-off solenoid 26 may be minimized using the control circuit 22 while still maintaining the energized state of the solenoid so that the fuel circuit 10 remains open for delivery of fuel to the engine. For example, when the power supply 30 provides a voltage to the regulator circuit 20, the regulator circuit receives voltage (V1) and outputs voltage (V2, e.g., 5V). The voltage (V2) is then received by the microcontroller 40 and the voltage (V3) is provided to the driver circuit 24, more specifically, to the base pin B1 of the transistor Q1. According to one configuration of the microcontroller, the voltage (V3) may be fluctuating or modulating between 0V and 5V according to a predetermined PWM profile. In addition, the driver circuit 24 may be receiving unregulated power (via voltage (V1)) from the power supply 30 at the driver circuit input (e.g., node N1 shown in FIG. 5).

The driver circuit 24 operates differently depending on whether the voltage (V3) at the base pin B1 is 0V or 5V. When the base pin B1 voltage is approximately 0V, no current flows through the transistor Q1 (i.e., from collector pin X1 to emitter pin E1). Thus, the only region of the driver circuit 24 where current is flowing is the loop comprising the solenoid 26 and the zener diode D2. For example, the current will be flowing through the diode D2 in its forward direction (e.g., counter-clockwise as illustrated in FIG. 5). In this instance, the amplitude of the current drawn by the solenoid 26 and diode D2 will vary, mostly depending upon the degree to which the solenoid 26 is energized (i.e., what percentage of the solenoid's energy capacity is currently being used). Where the solenoid 26 is completely de-energized, the current draw will be relatively high. And, for example, where the solenoid is nearly completely energized, the current draw will be relatively low. The temperature of solenoids rises most significantly in two situations: (1) during initial energization (e.g., due to the in-rush current provided to initially energize the solenoid when the solenoid is completely de-energized); and (2) when the solenoid is fully energized and the current continues to be provided to the solenoid.

When the base pin B1 voltage switches to 5V (as controlled by the microcontroller 40), current will substantially stop flowing through the zener diode D2 and flow through the coil of the solenoid and into the collector pin X1. Thereafter, the current will flow through the remainder of the transistor Q1 (and through the resistor R5 to ground). As the current path to ground allows the solenoid 26 to discharge or de-energize, the temperature of the solenoid at this time will not continue to rise; in some instances, the temperature may decrease.

As previously discussed, the switching frequency of the PWM profile may determine the behavior of the driver circuit 24. Further, the PWM profile(s) may provide a sufficient current through the solenoid coil 48 to move the armature 46 against the spring 49 and open the valve head 50 (e.g., in-rush current) and a sufficient current (e.g., secondary current) to retain the valve head in the open position, spaced from the valve seat 52. These profile(s) may be predetermined and pre-configured to minimize the energy consumption (and resulting heat dissipation) of the shut-off solenoid 26. For example, the secondary current may be optimized such that it is the minimal current required to maintain the open position of the valve head 50, thereby minimizing energy consumption and heat dissipation. These PWM profiles will partially depend upon the characteristics of the particular shut-off solenoid (e.g., resistance, stroke, holding force, force of spring 49, in-rush current, secondary current, etc.). Thus, a range of switching frequencies may be suitable depending on the duty cycle and solenoid characteristics. Similarly, a range of duty cycles may be suitable depending on the switching frequency and the particular solenoid.

Figure 6:
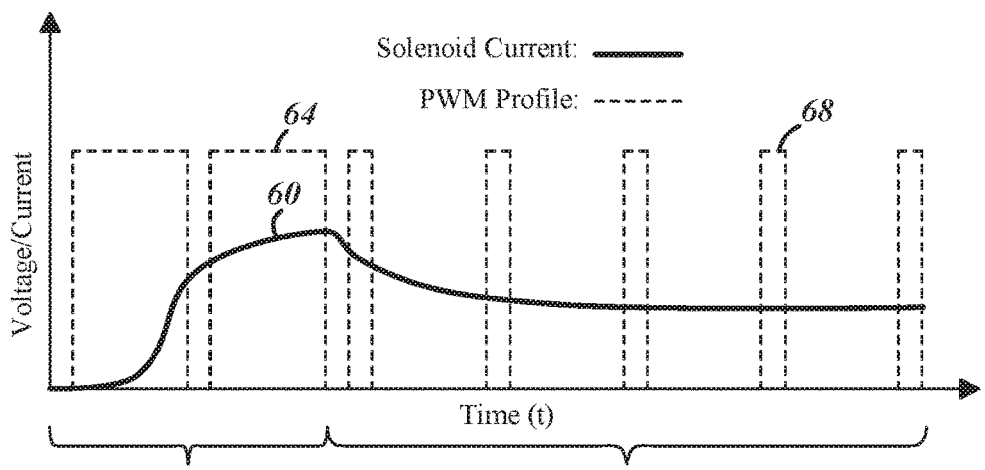
FIG. 6 is a graphical representation of a shut-off solenoid at start-up and a pulse wave modulation signal.

In one implementation, two PWM profiles may be used. The first PWM profile may coincide generally with the in-rush current and the other PWM profile may coincide with the secondary current. FIG. 6 illustrates these two exemplary PWM voltage profiles and additionally illustrates an exemplary solenoid current draw profile 60. The independent axis is time (t). Thus for clarity, a representative current draw profile is merely overlaid atop the representative PWM profiles. In a first or peak phase 62, the solenoid current draw profile 60 curves rapidly upwardly to a current maximum corresponding to the in-rush current. Thus, in one example of the peak phase 62, a first PWM profile 64 may include a relatively larger duty cycle (e.g., between 70-100%). In a second or hold phase 66, the solenoid current draw profile 60 decreases and approaches a steady-state value. Thus, in one example of the hold phase 66, the PWM profile may change to a second PWM profile 68 having a smaller duty cycle (e.g., between 10-30%).

Therefore, when the solenoid 26 needs to be energized at the greatest rate in order to drive the armature 46 to an open position (e.g., associated with the in-rush current), the transistor Q1 allows current to pass therethrough at the greatest rate (e.g., between 70-100% of the time according to the duty cycle). And once the solenoid is generally energized and thereafter requires less energy to remain energized (e.g., associated with the secondary current), the transistor Q1 allows current to pass therethrough at a lesser rate (e.g., between 10-30% of the time according to the duty cycle).

In one implementation, the microcontroller 40 may be programmed to provide two or more PWM profiles in sequence according to a predetermined timing. For example, the first PWM profile may occur prior to the second PWM profile; and the first PWM profile may occur for a predetermined period of time (e.g., 0.25-5.0 seconds), and then the second PWM profile may begin. In this configuration, the control circuit functions in an open loop. For example, where a commercially available shut-off solenoid such as a Bicron™ Electronics solenoid is used, the first PWM profile may continue for approximately 100 ms (milliseconds) (e.g., where the battery voltage is 10-16V, the maximum battery current draw is 0.5 A, etc.).

In other implementations, the microcontroller 40 may be configured to switch from the first PWM profile to the second PWM profile when the current sensed via node N4 is less than or equal to a predetermined current value. In this configuration, the control circuit functions closed loop. For example, where the Bicron shut-off solenoid is used, the second PWM profile may begin once the current is less than 0.1 Amps.

In another implementation, the microcontroller 40 may be configured to provide the first PWM profile as a steady state voltage (V3) (e.g., 100% duty cycle) for a period of time allowing the solenoid 26 to energize. This may be used without a current sense at the microcontroller; i.e., open loop. Thus, the period of time may be predetermined according to calculated or empirical data. Thereafter, the second PWM profile may be the same as or similar to that described above.

It has been empirically determined that by providing power to the shut-off solenoid 26 according to a first PWM profile (duty cycle of 80%, frequency of 25 kHz) until the valve 50, 52 is opened by the actuation of the armature 46 and thereafter providing power to the solenoid 26 according a second PWM profile (duty cycle of 20%, frequency of 25 kHz), the energy consumption not only decreased, but the average temperature of the solenoid was reduced by 40 degrees Fahrenheit. This can be desirable since excessive heat from the solenoid has been shown to vaporize fuel carried by the carburetor resulting in an inaccurate fuel-air mixture delivered to the engine (e.g., an undesirably lean fuel-air mixture).

Figure 7:
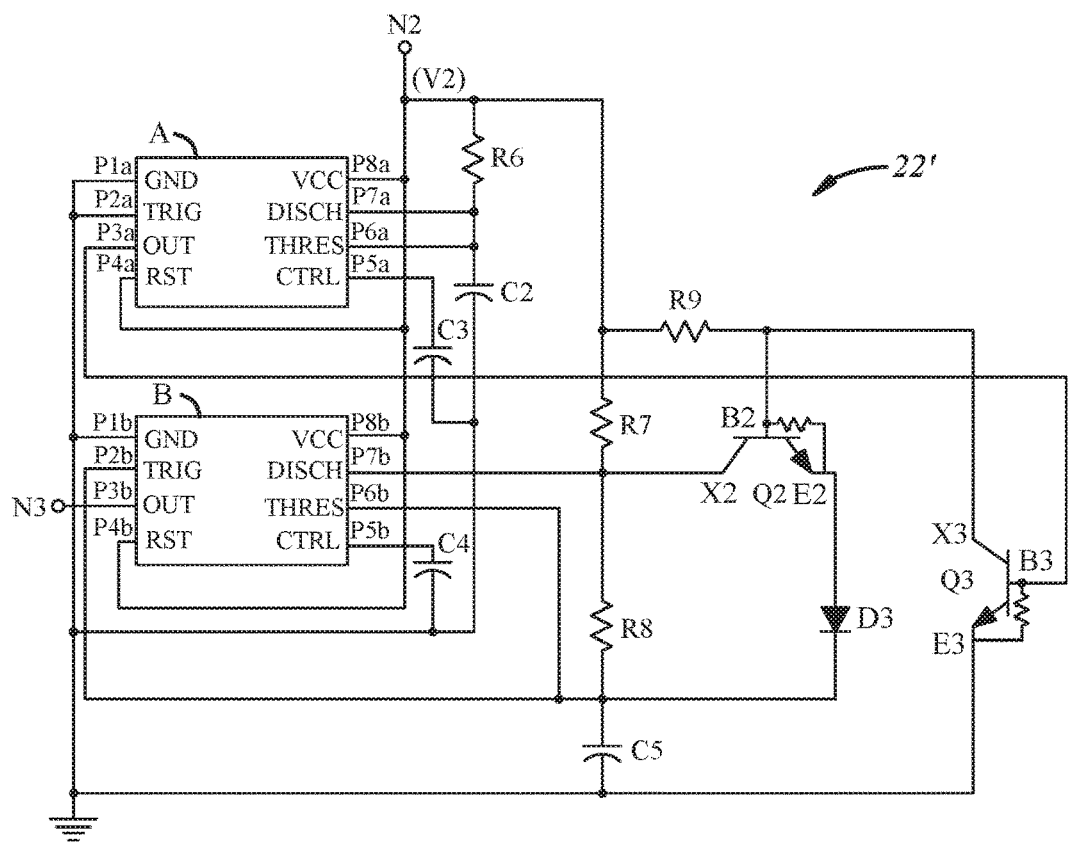
FIG. 7 is another implementation of the control circuit of the electrical schematic diagram of FIG. 2.

Now turning to FIG. 7, another implementation of a control circuit 22' is shown. In the implementation shown, the control circuit 22' includes two timers A, B or timer circuits (e.g., shown here as integrated circuits (ICs) or 555 timers), two transistors Q2, Q3 (shown as NPN-type bipolar junction transistors each having a collector pin, a base pin, and an emitter pin—e.g., X2, B2, E2 and X3, B3, E3, respectively), a diode D3, four resistors R6, R7, R8, R9 and three capacitors C2, C3, C4, C5. The illustrated timers A, B each have the following pins: P1=ground (GND); P2=trigger (TRIG); P3=output (OUT); P4=reset (RST); P5=control (CTRL); P6=threshold (THRES); P7=discharge (DISCH); and P8=power (VCC). Thus, in FIG. 7, timer A has pins P1a, P2a, P3a, P4a, P5a, P6a, P7a, and P8a; and timer B has pins P1b, P2b, P3b, P4b, P5b, P6b, P7b, and P8b. The values of the resistors and capacitors may vary.

The timers A and B are arranged to receive voltage (V2) from node N2 at pins P8a, P8b, respectively; and the timer B is arranged to provide voltage (V3) from pin P3b to node N3 that conforms to two predetermined PWM profiles. The PWM profiles (more specifically, the pulse widths and/or frequencies) are based upon the values of some of the shown resistors and capacitors in the control circuit 22', as will be appreciated by skilled artisans. For example, in one instance, the pulse width at the output pin P3b generated by timer B may be determined by the RC time constant or approximately $1.1*(R7+R8)*C5$.

Timer A is shown having pins P1a and P2a tied to ground. While pin P1a is conventionally tied to ground, having pin P2a tied to ground maintains the trigger of the timer A (i.e., it remains triggered as long as timer A remains powered, since timers A and B trigger low). Pin P3a is coupled to the base pin B3 of transistor Q3. Pins P4a, P8a are coupled to node N2 (to receive voltage (V2)). Pin P5a is coupled to ground via capacitor C3, e.g., to minimize noise in the circuit. And pins P6a, P7a are coupled to the junction of resistor R6 and capacitor C2, where the opposite end of R6 is coupled to node N2, and the opposite end of C2 is tied to ground.

Timer B is shown having pin P1b tied to ground. Pin P2b is tied to the emitter pin E2 of transistor Q2 via diode D3. Pin P3b provides the output to node N3 (or the driver circuit). Pins P4b, P8b are coupled to node N2 (to receive voltage (V2)). Pin P5b is coupled to ground via capacitor C4, e.g., to minimize noise in the circuit. Pin P6b is coupled to the trigger of timer B or pin P2b. And lastly, pin P7b is coupled to the collector pin X2 of transistor Q2 as well as to resistors R7 and R8—where R7 also is coupled to both node N2 and the emitter pin E2 of transistor Q2; and where R8 also is coupled to: the forward output of diode D3, the trigger of timer B (P2b), the threshold of timer B (P6b), and the capacitor C5 (which is otherwise tied to ground).

Thus, also according to FIG. 7, the base pin B2 of Q2 and the collector pin X3 of Q3 are both coupled to node N2 via resistor R9. Further, the emitter pin E3 of Q3 is coupled to ground. In addition, as pins P4a, P4b are both tied high (i.e., to voltage (V2)), the timers A, B may not reset; e.g., at least until the voltage at node N2 is 0V (e.g., when the fuel system 14 is powered off; i.e., when power is terminated from the power supply 30).

It also may be apparent that transistor Q2 may be enabled as long as an adequate voltage (V2) is provided at node N2; i.e., current may be allowed to pass from the collector pin X2 to the emitter pin E3 as long as node N2 provides sufficient current. And transistor Q3 may be enabled whenever the output of timer A (pin P3a) is high; i.e., current may pass from node N2 to ground.

In operation, the illustrated control circuit 22' of FIG. 7 runs open loop; i.e., there is no feedback signal to indicate when the PWM profile should change from a peak phase (or higher duty cycle) to a hold phase (or lower duty cycle). Thus, the control circuit 22' utilizes the timer A as a one-shot or single pulse (the duration of the one-shot pulse being the duration of the peak phase). Timer B is used as a pulse generator to provide two different 0V or 5V PWM profiles to the driver circuit. As soon as node N2 receives voltage (V2), timer B outputs (P3b) a first pulse width (e.g., a higher duty cycle pulse width, according to an RC constant of approximately $1.1*(R7+R8)*C5$). Similarly, as soon as node N2 receives voltage (V2), the timer A triggers and provides the one-shot pulse; the length of the one-shot pulse is determined by R6 and C2 (e.g., larger values for R6 and/or C2 will result in a longer one-shot pulse).

At the end of this one-shot pulse, the threshold (P6a) goes high resulting in the output (P3a) going low, and the output (P3a) going low disables the transistor Q3. Disabling Q3 results in a change in the RC constant of timer B which in turn alters the PWM profile from the first pulse width to a second pulse width. The new RC constant being approximated by $1.1*R7*C5$; which is a value less than the previous RC constant (i.e., $1.1*(R7+R8)*C5$)—therefore, the second pulse width profile provided by timer B (P3b) is shortened. Thus, the value of resistor R8 may determine the percent difference between the first pulse width and the second pulse width. In one implementation, the R8 is at least four times the value of R7.

This second pulse width may continue until power is terminated at node N2 (i.e., V2=0V). At which point, the reset of timers A and B (pins P4a, P4b) goes low, resetting the timers readying the control circuit for the next time power is provided at node N2.

The values of the resistors and capacitors may be chosen based upon the shut-off solenoid 26 and desired performance characteristics. For example, larger solenoids may require longer peak phase durations or higher duty cycles. And this may be true whether the control circuit is implemented using the microcontroller, the timers A, B, or any other suitable circuit arrangement. Furthermore, the control circuits 22, 22' shown in FIGS. 4 and 7 are merely exemplary; other circuit elements and arrangements are possible.

Other implementations are also possible. For example, the timers may include discrete components and/or be other integrated timers (e.g., a 556 timer). Or for example, the control circuit 22 may be configured to provide power to the solenoid 26 using any suitable frequency and/or amplitude modulation techniques and using digital and/or analog components.

Thus, there has been disclosed a shut-off solenoid in a fuel system. The shut-off solenoid may minimize blow-back or backfire as fuel ceases to flow in the fuel circuit at the time the engine is turned off. In addition, there has been disclosed several embodiments for controlling the amount of energy used by the shut-off solenoid and minimizing the heat dissipated thereby. The energy consumed by the solenoid may be controlled by a control circuit which may include, but is not limited to implementations having a microcontroller and one or more timers. Thus, the driver circuit and control circuit may provide a first magnitude of power to the solenoid to initially change the solenoid from its closed position to its open position and a second magnitude of power to maintain the solenoid in its open position wherein the second magnitude of power is less than the first magnitude. The driver circuit may have various arrangements to allow the shut-off solenoid to consume current less than 100% of the time in response to the control circuit. And it should be appreciated that the regulator circuit, control circuit, and driver circuit described herein are all exemplary as well; thus, other implementations may exclude one or more of these circuits and likewise may add one or more circuits not described herein.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method of operating a shut-off solenoid in a fuel system, comprising the steps of:
    providing a first power to a solenoid valve to displace an armature of the solenoid from a first position to a second position, wherein the fuel system is used to provide fuel to an engine and the first power is provided upon starting of the engine; and
    providing a second power to the solenoid after a predetermined period following start-up, the second power being less than the first power and sufficient to maintain the solenoid in the second position, wherein the second power is maintained until the engine is turned off.

2. The method of claim 1, wherein the first power is a pulse width modulated (PWM) waveform having a duty cycle greater than 50%.

3. The method of claim 2, wherein the PWM waveform has a frequency of at least 10 kHz.

4. The method of claim 1, wherein the second power is a pulse width modulated (PWM) waveform having a duty cycle less than 50%.

5. The method of claim 4, wherein the PWM waveform has a frequency of at least 10 kHz.

6. The method of claim 1, wherein the solenoid in the first position at least inhibits fluid flow through a fuel passage in a fuel circuit and in the second position permits a greater rate of fluid flow through the fuel passage than in the first position.

7. A method of operating a shut-off solenoid in a carburetor that supplies a fuel and air mixture to an engine to which the carburetor is mounted, comprising the steps of:
    providing a carburetor having a fuel circuit and a solenoid valve coupled to the fuel circuit, the solenoid valve having an armature movable between a fully open position in which fuel flows through the fuel circuit and a closed position in which fuel does not flow through the fuel circuit;
    providing a first power to the solenoid valve upon start-up of the engine to displace the armature from the closed position to the fully open position; and
    providing a second power to the solenoid after a predetermined period following start-up, the second power being less than the first power and sufficient to maintain the solenoid in the fully open position.

8. The method of claim 7 wherein the first power is provided until the armature fully reaches the fully open position.

9. The method of claim 7 which also comprises the step of providing the second power to the solenoid until the engine to which the carburetor is mounted is turned off.

10. A method of operating a shut-off solenoid in a fuel system, comprising the steps of:
    providing a first power to a solenoid valve at start-up to displace an armature of the solenoid from a first position to a second position; and
    providing a second power to the solenoid after the armature has reached the second position and after a predetermined period following start-up, the second power being less than the first power and sufficient to maintain the solenoid in the second position, wherein the first power is a pulse width modulated waveform having a duty cycle greater than 50%, and wherein the second power is a pulse width modulated waveform having a duty cycle less than 50%.

11. The method of claim 10 wherein the fuel system is used with an engine and wherein the first power is provided upon starting the engine and the second power is maintained until the engine is turned off.

\* \* \* \* \*